AMPLITUDE SPECTRUM

AMPLITUDE SPECTRUM

IMPULSE RESPONSE

IMPULSE RESPONSE

INVENTORS A. M. GERRISH
E. PORT
J. R. SHEEHAN
BY J. P. Kearns
ATTORNEY 3,508,153

AUTOMATIC EQUALIZER FOR PARTIAL-RESPONSE DATA TRANSMISSION SYSTEMS

Allan M. Gerrish, Little Silver, N.J., Erich Port, Stuttgart, Germany, and John R. Sheehan, Red Bank, N.J., assignors to Bell Telephone Laboratories, Incorporated, Murray Hill and Berkeley Heights, N.J., a corporation of New York Filed Sept. 11, 1967, Ser. No. 666,732
Int. Cl. H04b 1/12, 3/04
U.S. Cl. 325—42 12 Claims

ABSTRACT OF THE DISCLOSURE

The tapped transversal delay-line filter can be modified to increase its utility as an automatic equalizer for partial response digital data signals, i.e., signals whose impulse response has nonzero samples extending over more than one sampling period, by cross-correlating and comparing error and polarity components derived from more than one time-spaced sample of distorted signals traversing the equalizer for each incremental adjustment of the several tap attenuators. The relative polarities of such multiple samples are further taken into consideration in deciding whether or not to increment a given tap attenuator.

FIELD OF THE INVENTION

This invention relates to the correction of the distorting effects caused by transmission channels of limited frequency bandwidth on digital information signals and in particular to improvements in transversal equalizers for partial-response digital data signals.

BACKGROUND OF THE INVENTION

Considerable interest has arisen of late in the employment of partial-response signals for the transmission of digital data over bandlimited channels. The normal approach to maximizing binary data transmission rates over bandlimited channels has been to shape the channel response such that each data impulse generates but a single nonzero sample confined to a single sampling interval. Such a response may be considered a full response, and achievement of the theoretical maximum speed of two bits per cycle of bandwidth is attainable only with transmission channels possessing a flat amplitude-frequency response and absolute cutoffs at each bandwidth limit. Such channels, however, are not physically realizable. Even if they were, the sampling problem itself would be insuperable.

Partial-response signals, on the other hand, produce nonzero samples extending over more than one sampling interval. Intersymbol interference is deliberately provoked so that each sample includes contributions from more than one data bit. Nevertheless, the resultant intersymbol interference can be made predictable by proper channel shaping. Since the responses to successive input signals overlap under partial-response conditions, signals originally binary become multilevel channel signals. The effective binary transmission rate, however, can be doubled to the theoretical maximum with a multilevel channel signal. In spite of the overalpping responses to binary input signals at the doubled transmission rate, precoding techniques make it possible to recover binary signals from single samples of the multilevel received channel signals. A penalty in noise margin relative to equivalent full-response signals unfortunately results from the transformation of binary input signals to multilevel channel signals. In addition to the noise penalty sensitivity to channel distortion may be relatively more acute.

Automatic equalizers have been developed for full-response digital channels and have been found to perform well. However, their adjustment criteria have depended on the correlation of individual time-spaced samples of the received signals with individual error signals. Since partial-response signals have responses extending over more than one sampling interval, each equalizer adjustment must be based on the correlation of multiple samples of distorted received signals. It is accordingly a general object of this invention to adapt automatic equalization techniques to partial-response channel signals.

DESCRIPTION OF THE PRIOR ART

In the copending U.S. patent application of E. R. Kretzmer, Ser. No. 441,197 filed Mar. 19, 1965 and entitled "Partial-Response Multilevel Data System," now U.S. Patent No. 3,388,330 the concept of signal channel shaping to produce controlled correlation between received signal samples is introduced. In accordance with this concept the impulse response of a channel, or intermediate means linking a near data transmitter with a remote data receiver, is spectrally shaped so that each binary input symbol evokes a response extending over more than one signaling interval. The response is only partial, however, with respect to the length of any given signaling interval. The received symbol can then occupy a number (more than two) of discrete levels determined by the number of signaling intervals over which the channel impulse response extends and also by the character of the weighting imparted to each of the multiple responses. For example, if the channel is so shaped that each binary symbol evokes two equally weighted nonzero responses of the same polarity extending over two signaling intervals, a superposition of successive responses at the binary signaling interval results in a three-level channel signal whose amplitude-frequency response is a maximum at zero frequency and zero at a cutoff frequency numerically equal to half the signaling rate. The channel shaping exhibits a realistic full-cosine rolloff. This type of superposition is an example of a class denominated Class I by Kretzmer.

Several other classes of superposition are described by Kretzmer. In addition to the Class I equally weighted symmetrical superposition, another class of equally weighted asymmetrical superpositions designated Class IV is of particular practical interest. Class IV superpositions result from a symmetrical channel shaping with maximum transmission at the center of the transmission bandwidth and zero transmission at both upper and lower band limits. Direct-current components are advantageously eliminated in Class IV signaling.

In U.S. Patent No. 3,292,110 issued on Dec. 13, 1966 to F. K. Becker, R. W. Lucky and E. Port entitled "Transversal Equalizer for Digital Transmission Systems Wherein Polarity of Time-Spaced Portions of Output Signal Controls Corresponding Multiplier Setting," basic principles for automatically adjusting attenuators connected to evenly spaced taps on a transversal filter in accordance with the polarity of time-spaced samples of a distorted wave transversing such equalizer are presented. In accordance with these principles test signals traversing the delay line portion of the equalizer are successively sampled, summed and sliced to obtain error polarities, which are in turn stored in a shift register. Each stage of the shift register thereby stores an error polarity corresponding to the direction of the distortion at each delay line tap. When a complete set of samples derived from a particular test signal is obtained, the attenuator at each tap is incremented in a direction to reduce the error thereat. By means of a succession of test signals all attenuators are iteratively incremented until the net distortion is minimized consistent with the length of the delay line and the size of the incremental attenuator step.

In a copending application of R. W. Lucky, Ser. No. 483,129 filed Aug. 27, 1965 and entitled "Digital Adaptive Equalizer" and now U.S. Patent No. 3,414,819, the automatic equalization concept of the Becker et al. patent is extended to permit the continued adjustment of the tap attenuators during the transmission of message data in response to changing transmission channel characteristics. In the adaptive equalizer error signals are effectively obtained by taking the difference between the idealized amplitude of an estimated received signal and the actual amplitude sample. These error signals are then continually correlated with the estimated signal polarities to form directional control signals for attenuator incrementation.

The principles of automatic eqaulization disclosed in the aforesaid Becker et al. and Lucky patents are fully applicable to full-response signal systems but have not been found to be appropriate in their original form for partial-response signal systems. It is accordingly another object of this invention to extend the principles of the transversal filter automatic equalizer, both preset and adaptive, to partial-response signaling systems.

SUMMARY OF THE INVENTION

According to this invention, the transversal filter equalizer, including a tapped delay line, an incrementally adjustable attenuator for each such tap but a reference tap, a summation circuit for signals passing through the reference tap and each attenuator, and incremental adjustment means for each attenuator, is modified to process the summed output on a multilevel basis. Error and polarity components are then derived from time-spaced samples of signals traversing the equalizer and on the basis of correlations of such error components from more than one sample with such polarity components each attenuator is incremented in a direction to minimize such error components. The multilevel processor provides a polarity component, a detected signal component and an error component by successive slicing and folding operations. Successive error components are stored in a shift register to be compared with each other in accordance with the particular class of partial-response superposition of interest and further correlated with the ambient polarity component to determine the error direction and whether or not to increment the attenuators on the basis of a given set of samples.

Inasmuch as any distortion components are effectively echoes of the nonzero components of the particular superposition being equalized, only those error components that bear the same relationship to each other as the nonzero components of a particular superposition are true indicators of the type of distortion that is correctable by the transversal equalizer. Other error components may result from noise or some nonlinear channel disturbance. Thus, for the Class I superposition corrections are permissible only when succeeding error components are of the same polarity. Similarly, for the Class IV superposition corrections are legitimate only when error components two intervals apart are of opposite polarity. In addition, for either class of superposition when the signal is passing through zero, signal polarity is indeterminate or neutral and any apparent error component is spurious and no correction is made based on it.

An important feature of the invention is that the automatic transversal equalizer for partial-response signals can be constructed to operate in one of two modes: preset or adaptive. In the preset mode isolated test pulses of the same polarity are transmitted through the distorting channel and the transversal equalizer. The polarity of the error is then the algebraic sign of the difference between the amplitude of the actual received pulse and an ideal pulse of standardized amplitude. No separate correlation of signal polarity and error component is therefore required for the preset mode. The individual attenuators at taps on the delay-line portion of the equalizer are incrementally adjusted in a direction opposite to the polarity of the error component. The preset mode is especially valuable when the initial distortion results in a closed eye pattern.

In the adaptive mode attenuator adjustments continue to be made during actual message transmission. Message data, however, arrives continuously and the impulses of interest may be of either polarity. For adaptive operation, therefore, the error component observed must be correlated with the polarity of the detected data bit to determine the error correction to be applied to the tap attenuators. In addition, the presence of noise may cause unnecessary corrections. Therefore, it may be necessary to average correction pulses by means of integrating counters.

DESCRIPTION OF THE DRAWING

The several features and objects of this invention will be more fully appreciated by a consideration of the following detailed description and the drawing in which.

DETAILED DESCRIPTION

Of the five classes of partial-response signal superpositions described by Kretzmer in the above-noted patent application, the two of most practical interest have proved to be those designated Class I and Class IV. In the interest of concreteness only three-level examples of such partial-response signals will be considered herein.

Figure 1A:
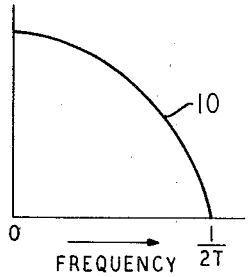
FIGS. 1A and 1B are respectively an amplitude-frequency spectrum and an impulse-response diagram for the Class I equal-weight symmetrical partial-response data signal.
Figure 1B:
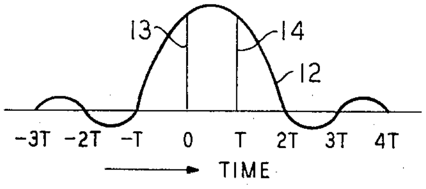

FIG. 1A illustrates the amplitude spectrum required to produce a Class I equal-weight symmetrical superposition for a binary input signal. Curve 10 represents a full cosine rolloff characteristic with maximum amplitude response at zero frequency (lower band edge) and a zero-amplitude response at the maximum frequency (upper band edge) of a band-limited transmission channel. The channel bandwidth is equal to the reciprocal of twice the signal sampling interval. A signal impulse applied to a channel shaped to the full cosine rolloff characteristic produces an impulse response as indicated in FIG. 1B. The envelope 12 of the impulse response extends over many signaling intervals and passes through zero amplitude at spaced signaling intervals at all but two such intervals: namely, the present sampling instant and the next following one. At these latter two instants samples taken have equal amplitudes as indicated by samples 13 and 14 occurring at times O and T. Thus, envelope 12 is equivalent to the superposition of the individual $(\sin x)/x$ impulse responses of two impulses delayed from each other by one signaling interval T. The normal full-response signaling interval for a channel of bandwidth ½T would be 2T seconds. Signaling at intervals T, however, produces the impulse response of FIG. 1B. For a negative impulse the response is the inverse of that shown in FIG. 1B. For continuous signaling with random input data a three-level line signal is obtained with response amplitudes at sampling instants of −2, 0 or +2 units assuming response amplitudes 13 and 14 are normalized at one unit.

Figure 2A:
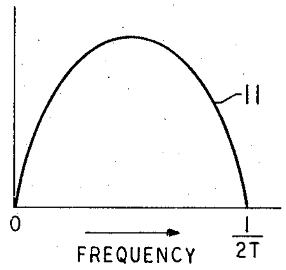
FIGS. 2A and 2B are respectively an amplitude-frequency spectrum and an impulse-response diagram for the Class IV equal-weight asymmetrical partial-response data signal.
Figure 2B:
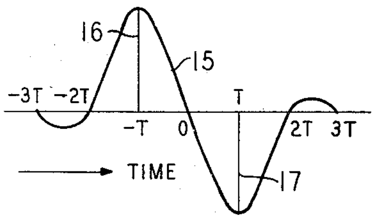

FIG. 2A illustrates in a similar manner the amplitude spectrum required to produce a Class IV equal-weight asymmetrical superposition for a binary input signal. Curve 11 represents a half-cycle sine wave with maximum amplitude response at the center of the frequency spectrum and full rolloffs to zero amplitude at upper and lower band edges. The channel bandwidth is the same as that of FIG. 1A, and the signaling interval is the reciprocal of twice the bandwidth as before. A signal impulse applied to a channel shaped to the half sine wave characteristic produces an impulse response as indicated in FIG. 2B. The envelope 15 of the impulse response passes through zero amplitude at time zero and extends over many signaling intervals. The response passes through zero at spaced signaling intervals at all but two such intervals: namely, the signaling instants immediately preceding and following the present sampling instants. At times −T and +T samples of unit height but of opposite polarity occur as indicated by samples 16 and 17. Thus, envelope 15 is equivalent to the superposition of the individual $(\sin x)/x$ impulse responses of two impulses of opposite polarity delayed from each other by two signaling intervals T. For a negative impulse the response is the inverse of that shown in FIG. 2B. For continuous signaling with random input data a three-level line signal is obtained with response amplitudes at the sampling instants of −2, 0 or +2 units assuming response amplitudes 16 and 17 are normalized at one unit.

Figure 3:
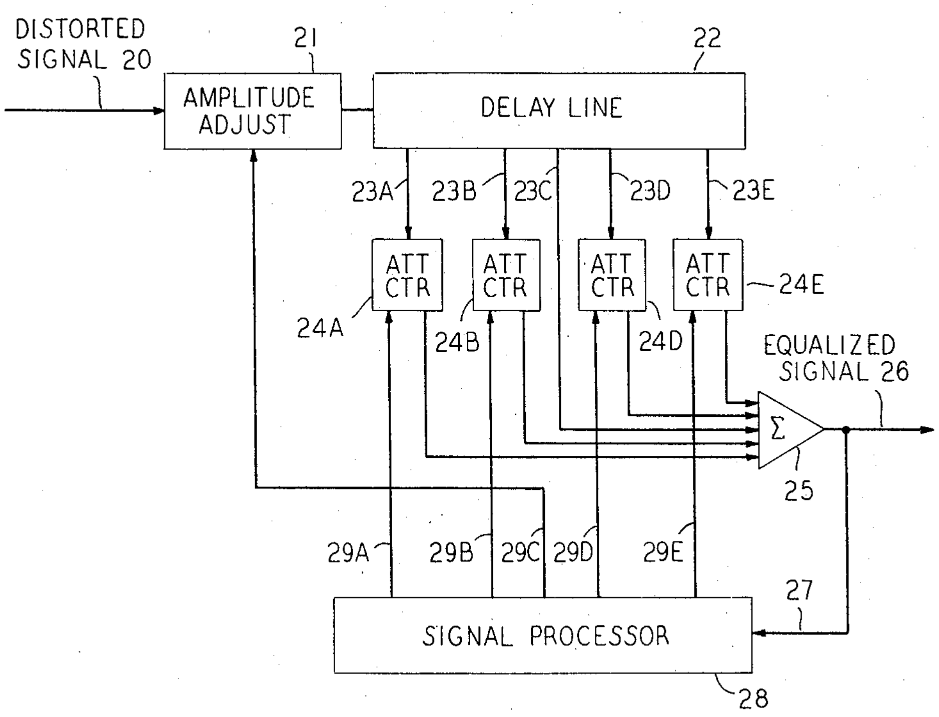
FIG. 3 is a generalized block diagram of the automatic transversal equalizer for partial-response signals according to this invention.

FIG. 3 is a generalized block diagram of the automatic transversal equalizer, the basic disclosure of which was made in the aforesaid Becker et al. patent. The basic transversal equalizer comprises delay line 22 with equally spaced taps (only five are shown to simplify the drawing) 23A through 23E thereon, a plurality of incrementally adjustable attenuator-counter circuits 24A through 24E in series with the outputs of all taps but one (23C) chosen as a reference tap, a summation circuit 25 for the direct output of the reference tap 23C and the attenuated outputs of attenuator-counters 24A through 24E, a signal processor 28 and normalizing amplitude adjust circuit 21 in series with the input to delay line 22. The distorted signal to be corrected is applied on lead 20 to the input of amplitude adjust circuit 21, which itself is an attenuator-counter of the same type as attenuator-counters 24A through 24E. The corrected signal appears on output lead 26.

In the Becker et al. patent the preset mode of operation is disclosed for correcting full-response input signals. The tap spacing is established at the reciprocal of the bandwidth of the channel being corrected. Isolated test signals spaced at intervals exceeding the length of delay line 22 are transmitted through the channel being equalized. At the signaling interval the output of summation circuit 25 on lead 27 is sliced at zero level in processor 28 and the resultant polarities stored therein except when the main component of the impulse appears at reference tap 23C, when a unity level slice is made. The first slice is taken when the main component arrives at tap 23A and the last slice is taken when the main component reaches tap 23E. There are then stored in signal processor 28 two leading distortion polarity samples, a polarity sample for normalizing the main component and two lagging distortion polarity samples. These several samples are gated to the attenuator-counters 24A through 24E and to amplitude adjust circuit 21 by way of leads 29A through 29E for incrementation thereof. It will be noted that lead 29C with its normalizing signal is applied to amplitude adjust circuit 21. Enough isolated test pulses are transmitted to bring all the output samples from summation circuit 25, except the one normalized sample, as nearly to zero as is possible within the finite length of delay line 22 and the size of the increment in attenuator-counters 24.

The impulse response of a full-response channel includes only one main component for each input signal. Taking one distortion sample for each leading and lagging echo of this main component is sufficient to compensate a full-response channel. For the partial-response channel, however, more than one main component occurs for each input signal and therefore special modifications of the signal processor are required, depending not only on the presence of a partial-response received signal rather than a full-response signal, but also on the particular class of partial-response signal.

An ideal partial-response pulse can be defined in terms of the pulse values $p_i$ at the sampling times $iT$, where $i$ is an index number and T is the bit or sampling interval.

The Class I partial-response pulse is thus defined as $$p_i=\begin{cases}1 & i=0,1\\ 0 & \text{elsewhere}\end{cases} \tag{1}$$

Similarly, the Class IV partial-response pulse is $$p_i=\begin{cases}1 & i=0\\ -1 & i=2\\ 0 & \text{elsewhere}\end{cases} \tag{2}$$

If the ideal partial-response pulse is passed through a bandlimited transmission channel, a distorted received pulse $x(t)$ results. An error component $e_i$, relative to the ideal pulse results and is defined at each sampling instant as $$e_i=x_i-p_i \tag{3}$$

The total distortion then becomes $$D=\sum_i|e_i|=\sum_i|x_i-p_i| \tag{4}$$

The automatic equalizer operates by passing the distorted pulse through a delay line as in FIG. 3 with variable tap gains $c_n$, spaced at multiples of the bit interval T. The taps $c_n$ must be adjusted to minimize the distortion D.

If $x(t)$ is taken as the output of the reference tap of the delay line with normalized unity gain, i.e., $c_0=1$, then the output of the equalizer becomes $$y(t)=\sum_{-K}^{L} c_n x(t-nT) \tag{5}$$

The number of taps on the delay line is counted integrally from −K to L (for the symmetrical five-tap delay line used in the illustrative embodiments $K=L=2$).

The distortion D of Equation 4 can be rewritten $$D=\sum_i\left|\sum_n c_n x_{i-n}-p_i\right| \tag{6}$$

Here it is assumed that $c_0=1$ and the gain $x(t)$ is adjusted to make $x_0=p_0$.

This distortion D has been shown to be a convex function of the tap gains $c_n$ and hence to possess a unique minimum value. A convex function is one having only one minimum value.

For preset equalization prior to actual message data transmission a series of isolated test pulses are passed through the delay line and the individual taps are adjusted by an increment Δ by means of digital gain controls. The algorithm for changing the $m$th tap in the proper direction is $$\Delta c_m=-\Delta\,\mathrm{sgn}\left\{\sum_i p_i\,\mathrm{sgn}\,e_{i+m}\right\} \tag{7}$$

where $p_i$ is the ideal pulse value, $m\neq 0$, and $$\mathrm{sgn}\,x=\begin{Bmatrix}1 & x>0\\ 0 & x=0\\ 1 & x<0\end{Bmatrix} \tag{8}$$

For the Class I pulse, Equation 7 becomes $$\Delta c_m = -\Delta \text{ sgn } \{\text{sgn } e_m + \text{sgn } e_{m+1}\} \quad (9)$$

For the Class IV pulse, Equation 7 becomes $$\Delta c_m = -\Delta \text{ sgn } \{\text{sgn } e_m - \text{sgn } e_{m+2}\} \quad (10)$$

Equations 9 and 10 make it clear that each tap adjustment is dependent on the polarities of more than one error sample. For Class I pulses the adjustment of tap $c_m$ is made only if the error polarities of two adjacent samples $e_m$ and $e_{m+1}$ are of the same polarity. Therefore, it must be arranged so that corrections are made only if adjacent error samples are of the same polarity.

For Class IV pulses the adjustment of a tap $c_m$ is made only if error polarities of samples spaced by two bit intervals are of opposite polarity. Therefore, it must be arranged that corrections are made if such error samples are of opposite polarity.

There is an additional consideration applicable to partial-response transmission systems that is not present in full-response systems. For partial-response systems it is not, in general, feasible to determine signal polarity at all sampling instants. When the signal is passing through the center of zero-crossing level, any apparent polarity detected by a slicer circuit is spurious and due solely to system distortions or jitter in the sampling pulses. Consequently, any equalizer corrections based on such apparent polarities would be unreliable. Provision is therefore made in the partial-response equalizer to inhibit the incrementation of any tap attenuator when the signal polarity is indeterminate or neutral. The value of $x$ in Equation 8 is zero when the signal polarity is indeterminate.

Each incrementation of a tap results in incremental echoes at other taps. Therefore, all taps must be incremented in an iterative process to reduce the overall distortion to its minimum value consistent with the length of the available delay line and the size of the increment.

With a small modification the partial-response equalizer can be made to operate in an adaptive mode, that is, during message data transmission. It was assumed above that the test pulses were all of positive polarity and mutually isolated, but in the transmission of random data negative pulses and overlapping responses will occur as well. Equations 9 and 10 will be reversed in polarity when the transmitted pulse is negative. This situation can be taken into account by multiplying Equations 9 and 10 by the polarity of the detected data bit at time $n-m$, where $n$ is the error sampling time and $m$ is the tap being adjusted. Thus, for adaptive operation Equations 9 and 10 are rewritten as $$\Delta c_m = -\Delta \text{ sgn}\{\text{sgn } e_n + \text{sgn } e_{n+1}\} p_{n-m} \quad m \neq 0 \quad (11)$$

and $$\Delta c_m = -\Delta \text{ sgn}\{\text{sgn } e_n - \text{sgn } e_{n+2}\} p_{n-m} \quad m \neq 0 \quad (12)$$

In actual operation the error voltages are functions not only of the distortion corrected by tap $c_m$, but also of all the remaining distortion in the pulse plus noise. Inclusion of the signal polarity term $p_{n-m}$ in Equations 11 and 12 biases the correction $\Delta c_m$ in the proper direction, but in order to avoid making unnecessary corrections in the correction pulses may be averaged by means of integrating counters. Corrections are then made only on the overflow in one direction or the other of such counters.

Figure 4:
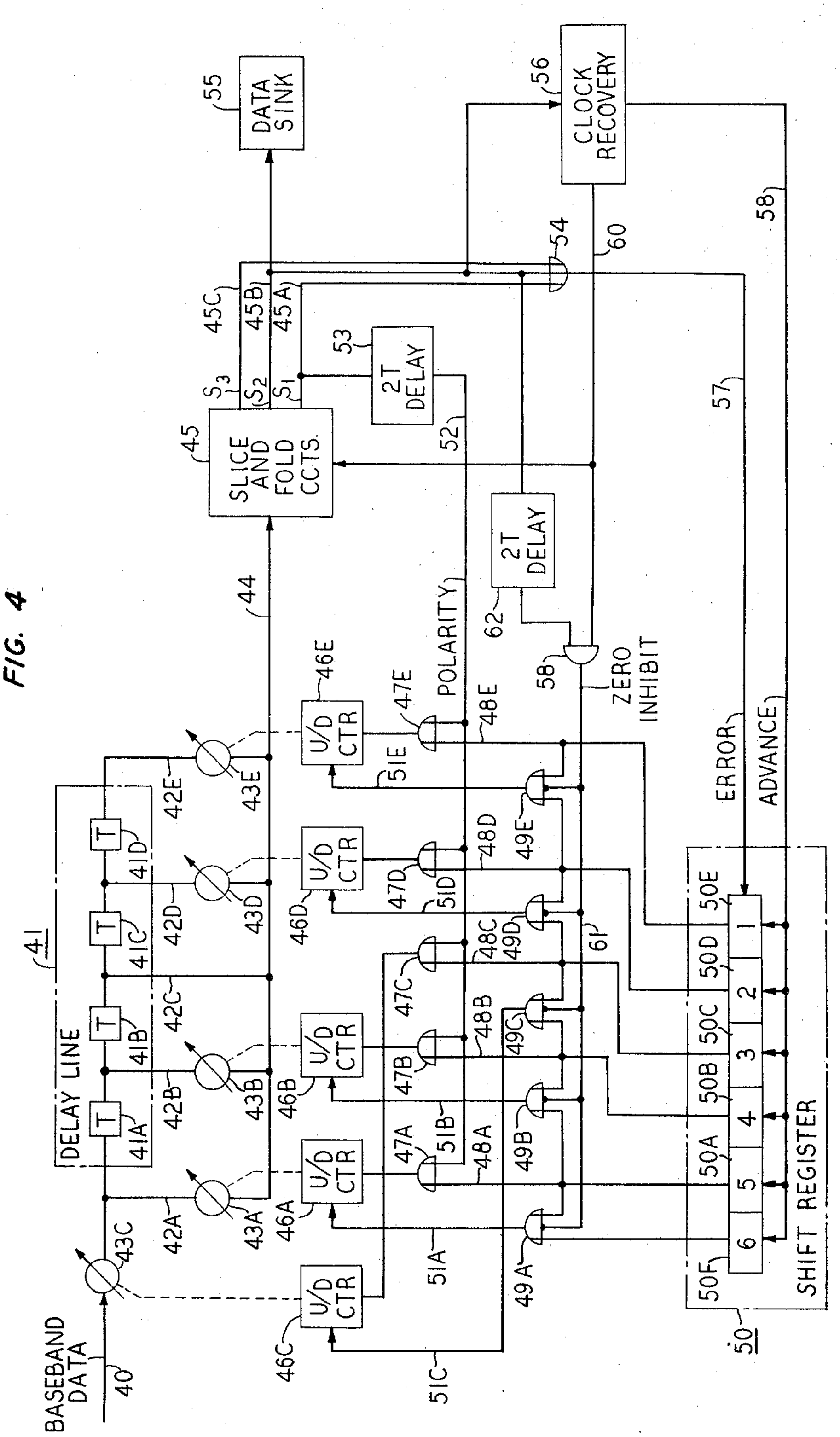
FIG. 4 is a detailed block schematic diagram of the adaptive automatic transversal equalizer of this invention as applied to Class I partial-response data signals.
Figure 5:
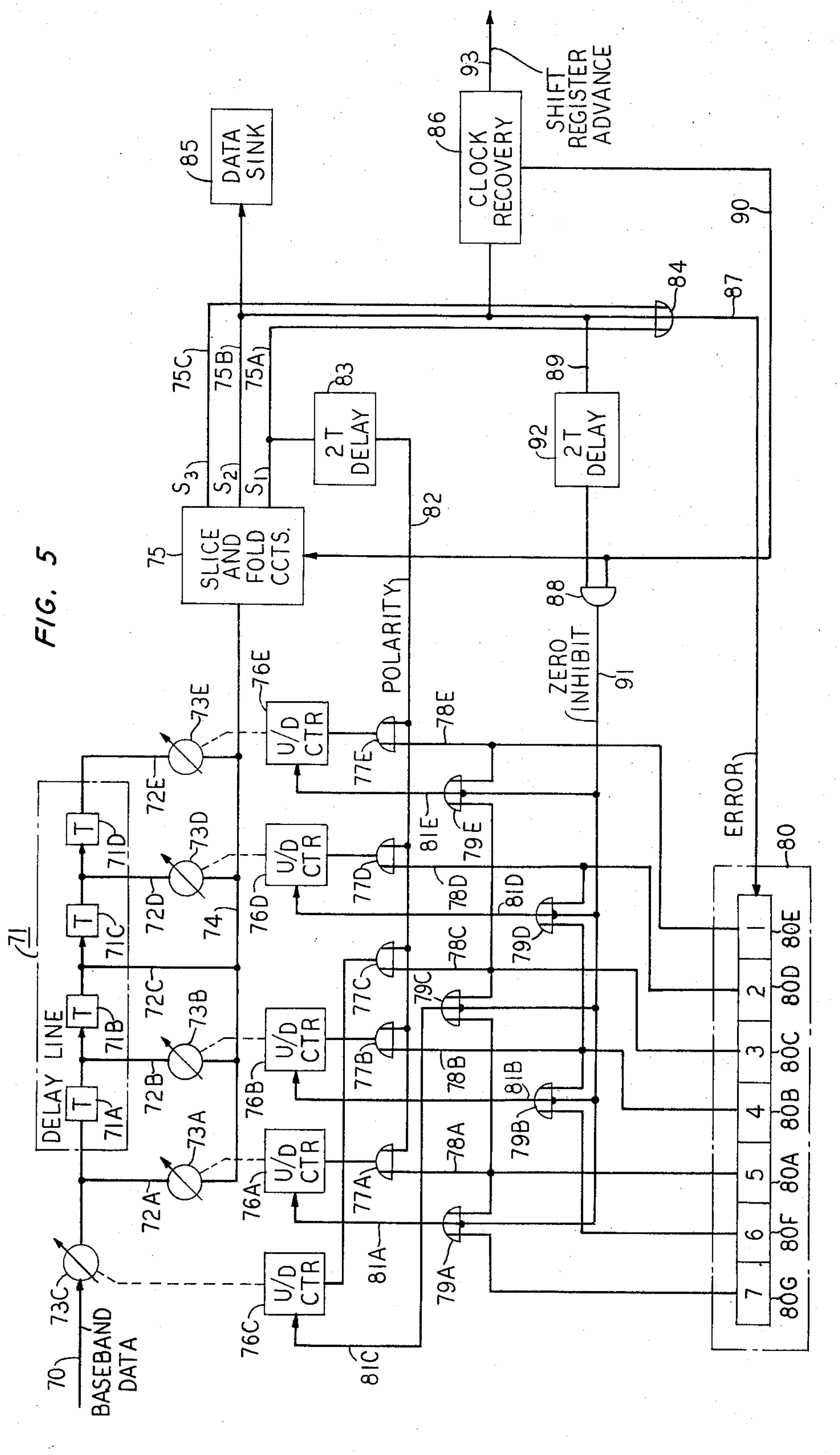
FIG. 5 is a detailed block schematic diagram of the adaptive automatic transversal equalizer of this invention as applied to Class IV partial-response data signals.

FIGS. 4 and 5 depict partial-response equalizers in the adaptive mode according to this invention for Class I and Class IV superpositions respectively. In these figures the circles with arrows therethrough designated 43 and 73 represent incrementally adjustable attenuators which may advantageously be of the ladder type described in the aforesaid Becker et al. patent. Square blocks 46 and 76 represent up-down or reversible counters, also as previously described in the aforementioned Becker et al. patent. Gates 47 and 77 are logical exclusive-OR gates which function as modulo-two adders. Gates 49 and 79 in addition to having the exclusive-OR inputs also have an inhibiting input as indicated by the semicircular dot thereon. Gates 54 and 84 are three input exclusive-OR gates. Each of delay lines 41 and 71 has four stages of delay with equal increments of T seconds, the sampling interval. The center tap is the reference tap and there are in addition two each of leading and lagging taps.

Figure 6A:
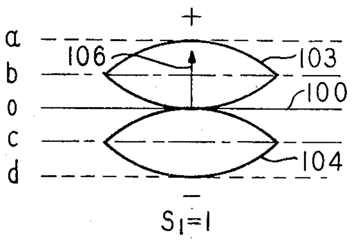
FIGS. 6A, 6B and 6C are multilevel eye pattern diagrams helpful in explaining the operation of an analog-to-digital converter for recovering polarity, data and error components from the output of the automatic equalizer.

Blocks 45 and 75 in FIGS. 4 and 5 are analog-to-digital converters which operate by repeated steps of slicing and folding. Such analog-to-digital converters for multilevel signals are described in detail in the above-mentioned Lucky patent. Their functional operation can be reviewed in connection with FIGS. 6A, 6B and 6C. It will be remembered that the partial-response pulses of particular interest herein are represented by three-level signals. FIG. 6A therefore represents a three-level eye pattern. An eye pattern results from displaying on an oscilloscope the superposition of successive random data signals. It is a useful analytical tool in data transmission evaluation. Eyes 103 and 104 of FIG. 6A are T seconds in width and their vertical dimensions at the center are the amplitude of the received signals. Zero level is represented by solid line 100, maximum positive excursion *a* is the ideal positive signal of two-units amplitude and maximum negative excursion *d* is the ideal negative signal also of two-units amplitude. Broken lines *b* and *c* are slicing levels separating positive and negative samples from zero samples. In accordance with partial-response precoding samples falling between slice levels *b* and *c* are decoded as binary ones, and larger samples, as binary zeroes.

Arrow 106 represents an actual received sample at some particular sampling time. It represents a binary zero. However, it is nonideal due possibly to noise perturbation and does not reach full positive level *a*. It is in error by the difference between level *a* and its actual value. This error is in the negative direction.

In a first step shown in FIG. 6A sample 106 is sliced at zero level 100 in slice-and-fold circuits 45 and 75 and a positive reading is obtained, that is, $S_1=1$. This is the received signal polarity. If sample 106 were smaller than slice level *b*, its polarity would be deemed indeterminate.

Figure 6B:
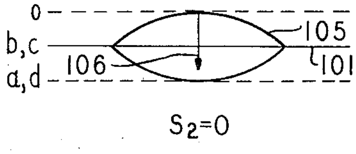

In a second step shown in FIG. 6B the three-level eye pattern is folded about level 100 so that levels *a, d* and *b, c* are superposed. Arrow 106 is inverted as shown. A new slicing level 101 is established midway between levels 0 and *a, d*. The second slice is negative and $S_2=0$. Were this slice positive, the signal polarity of the first step would be clearly indicated as neutral or indeterminate. This slice represents the detected data bit. The output of this slicer is delivered to the data sink.

Figure 6C:
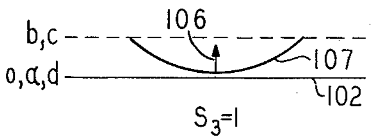

In the final step shown in FIG. 6C the convoluted single eye of FIG. 3B is again folded about the former slicing level 101 so that level 0 is superposed on levels *a, d*. Arrow 106 is again inverted. Another slicing level 102 is established. The third slice $S_3=1$ is positive and represents the error component. The error direction to be applied to the attenuator-counters is the modulo-two summation of the three slices $S_1 \oplus S_2 \oplus S_3$. In this particular instance the summation is 0, indicating the error direction is negative, as previously stated.

Figure 7:
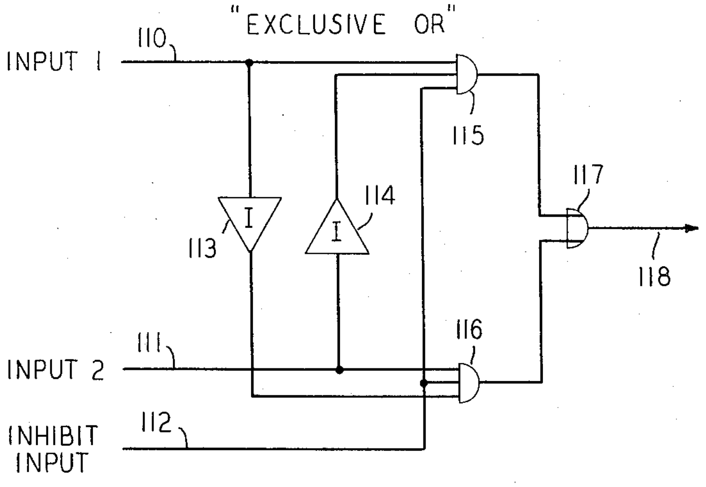
FIG. 7 is a logic diagram of a gated exclusive-OR circuit useful in the practice of this invention.

FIG. 7 is a detailed block diagram of the logical exclusive-OR gates 49 and 79 of FIGS. 4 and 5 with an inhibit input. Basically the exclusive-OR circuit produces a significant output if and only if one and only one of its inputs is also significant. A nonsignificant output is produced otherwise. The significant output may be chosen to be binary one or binary zero. The exclusive-OR gate can be constructed of two AND-gates 115 and 116, two inverters 113 and 114 and one conventional OR-gate 117. Input lines 110 and 111 connect directly to AND-gates 115 and 116 and through inverters 113 and 114 to opposite AND-gates. AND-gates 115 and 116 therefore have significant outputs only when inputs 110 and 111 are binary complements. Both AND-gates have their outputs connected to OR-gate 117. When either AND-gate has an output, such output appears on output line 118 after buffering in OR-gate 117. The additional inhibit input on line 112 connects to both AND-gates 115 and 116 and allows an output from one or the other of the AND-gates only when such inhibit input is itself significant. Otherwise the outputs of the AND-gates are inhibited.

FIG. 4 implements the Class I partial-response equalizer. As a preset equalizer the following elements are required: input line 40 for distorted baseband received data, amplitude-adjust attenuator 43C; delay line 41 with stages 41A through 41D; equally spaced tap lines 42A through 42E; tap attenuators 43A, 43B, 43D and 43E; summing bus 44; slice-and-fold circuits 45; up-down reversible counters 46A through 46E controlling attenuators 43A through 43E; exclusive-OR adder 54; shift register 50 having one more stage (50A through 50F) than the number of taps on delay line 41; inhibited exclusive-OR circuits 49A through 49E having inputs from adjacent stages of register 50, and outputs controlling respective up-down counters 46; clock circuit 56; delay buffer 62; AND-gate 58; and data sink 55. In the preset mode gates 47A through 47E serve only as buffers between the shift register stages 50A through 50E and up-down counters 46A through 46E. Polarity line 52 and delay buffer 53 are not used. Operation in the preset mode is controlled by clock circuit 56 which produces timing signals at the message data rate $1/T$ on leads 58 and 60. The direct output on lead 58 advances shift register 50 and a slightly delayed output on lead 60 provides sampling pulses to slicer 45 at the center of the eye pattern. When the isolated test pulses arrive on input lead 40, time-spaced samples from the taps on delay line 41 are added and sliced in slicer 45 and successive error components are derived in adder 54. These error components are successively stored in the stages 1 through 6 of shift register 50. Depending on the polarity of the error components, counters 46A through 46C are made to count up or down over leads 48A through 48E and buffer gates 47A through 47E. However, exclusive-OR gates 49A through 49E are enabled only when the error components stored in adjacent stages of register 50 are of the same polarity. The outputs of gates 49 are inhibited over lead 61 by the output of AND-gate 58, however, whenever the signal polarity is neutral as indicated by slice $S_2$. Delay buffer 62, having 2T units of delay, aligns the signal sample from slice $S_2$ of circuit 45 with the reference tap on delay line 41.

A "1" output on a lead 48 advances the corresponding counter 46 one count, while a "0" output retards the counter one count. The changing count on counters 46 correspondingly increments an associated attenuator 46. A positive error increments the attenuator in the negative direction and vice versa. The center or neutral count of counters 46A, 46B, 46D and 46E corresponds to zero attenuation. The neutral count on counter 46C, however, corresponds to unit gain through attenuator 43C, which is placed in series with the received distorted signal for normalization purposes.

Successive test pulses result in settings of the attenuators 43 such that the net contribution to the sum signal on bus 44 from all delay-line taps results in a signal which is as close as possible to the ideal Class I impulse response. The control signals on leads 51 will have prevented spurious adjustments whenever a false error indication or an indeterminate signal polarity indication is present. So much of FIG. 4 as has just been described implements Equation 9 above.

The equalizer of FIG. 4 is made adaptive to message data by the relatively simple modification of adding delay buffer 53 and polarity lead 52 to the previously enumerated elements. Buffer 58 has a delay of 2T or twice the signaling interval to correlate the error components on leads 48 with future and past signal polarities. Thus, present time is placed to correspond to the center reference tap on delay line 41, which has five taps thereon. Signal polarity is derived from the first slice in slice-and-fold circuit 45. The correlation with the error components takes place in exclusive-OR gates 47A through 47E, whose outputs control the up and down counts of counters 46A through 46E. In addition clock circuit 56 is now synchronized with the recovered data transitions on lead 45B, the result of the second slice $S_2$ from slice-and-fold circuit 45. Averaging of error signals can be readily accomplished, if necessary, by arranging counters 46 so that incrementation of the attenuators occurs only when there is an overflow in the positive or negative direction. At the overflow instant the counters are also reset to the neutral count. In the adaptive mode the equilizer circuit of FIG. 4 implements Equation 11 above.

FIG. 5 illustrates in detail an automatic equilizer for Class IV partial-response signals. In general the same components are used as in FIG. 4 and corresponding designators differ by 30 numbers. The equalizer of FIG. 5 is also operable in either the preset or adaptive modes. In the preset mode buffer 83 and polarity lead 82 are inoperative. In the adaptive mode all elements shown in FIG. 5 are used. In the preset mode Equation 10 is implemented and in the adaptive mode, Equation 12.

In view of the close relationship between the equalizers of FIGS. 4 and 5 a complete listing of its elements is omitted. FIG. 5 differs principally from FIG. 4 in having a seven-stage shift register 80 to take account of the fact that the Class IV signal has nonzero components spaced by two signaling intervals. Exclusive-OR gates 79 take their inputs from nonadjacent (spaced-by-two) stages of shift register 80 and have a delayed inhibiting input on lead 91. As in the arrangement of FIG. 4, a zero inhibit signal on lead 91 is derived from the second slice $S_2$ from slice-and-fold circuit 75 and is synchronized with the sample pulse on lead 90. If the received signal polarity is neutral ($S_2=1$), any apparent error component from slice $S_3$ is regarded as spurious and no attenuator adjustment is made on this account. The zero inhibit signal on lead 91 delayed in buffer 92 and synchronized in AND-gate 88 with the output of clock 86 on lead 90 blocks all exclusive-OR gates 79 and prevents any new counts from being registered in counters 76 in an obvious manner in view of the previous description of FIG. 7. For random data the signal polarity is neutral about 50 percent of the time, that is, whenever data signals two sampling instants apart are of the same polarity and cause a cancellation effect.

These equalizers will generally be operated in the adaptive mode, but in many cases the initial error rate may be high enough to require an initial period of preset equalization.

The principles described in detail with respect to the Class I and Class IV partial-response signaling formats can be extended in a straightforward manner to include general partial-response signals in accordance with the preceding analysis.

The distortion eliminated by the automatic equalizer is not only that due to gain and phase variations of the channel but also that due to variations of gain and phase produced by filters and circuit components of the receiver itself.

What is claimed is:

1. In combination with a receiver for data signals having nonzero response components of known relative polarity extending over more than one signaling interval and including a transversal filter equilizer with incrementally adjustable attenuators at a plurality of taps thereon, means for establishing settings for said attenuators responsive to such data signals distorted by traversing a bandlimited transmission channel and said equalizer comprising a summing bus for forming the summed output of all of said taps of said equalizer, an analog-to-digital converter for said summed output, means deriving from said converter error components of distortion, indicative of the polarity of said distortion of the transmitted data signals, means storing the polarity of said error components, means sequentially applying said error component polarities to said attenuators to effect incremental adjustment thereof, and means responsive to a comparison of selected time-spaced error components to determine relative polarity therebetween enabling adjustment of a particular attenuator only when such relative polarity comparison matches the known relative polarity of nonzero components of the data signal.

2. In combination with a receiver for partial-responsive signals which encode random data including a transversal equalizer with incrementally adjustable attenuators at a plurality of taps thereon, means for establishing distortion-minimizing settings for said attenuators responsive to such signals traversing a distorting transmission channel and aid equalizer comprising a summing bus for forming the summed output of all of said taps of said equalizer, an analog-to-digital converter for said summed output, means deriving from said converter error polarity distortion components, indicative of the polarity of said distortion of the transmitted data signals, means sequentially storing said error polarities, means responsive to said stored error polarities incrementally adjusting said attenuators, and means responsive to a comparison of relative polarities of selected time-spaced error polarities generating an enabling signal and thereby enabling the adjustment of said attenuators only when such comparison of relative polarities matches the relative polarities of nonzero response components of the particular partial-responsive signal being received.

3. The combination in accordance with claim 2 in which each individual datum is encoded as a partial-responsive signal which includes two equal nonzero response components of like polarity at adjacent signaling instants and results, upon the transmission of successive datum so encoded, in a three-level received signal, said analog-to-digital converter repetitively slices and folds said received signal and the modulo-two summation of three such slices yields said error polarity components, and said enabling means responds to a comparison of the polarities of successive pairs of stored error polarities and generates an enabling signal only when such pairs are of the same polarity.

4. The combination in accordance with claim 2 in which each individual datum is encoded as a partial-responsive signal which includes two equal nonzero response components of opposite polarity spaced apart by two signaling intervals and results, upon the transmission of successive datum so encoded, in a three-level received signal, said analog-to-digital converter repetitively slices and folds said received signal and the modulo-two summation of three such slices yields said error polarity components, and said enabling means responds to a comparison of polarities of pairs of successive error polarities spaced apart by two signaling intervals and generates an enabling signal only when such pairs are of opposite polarity.

5. The combination in accordance with claim 2 in which isolated partial-response signals separated by signaling intervals exceeding the effective length of said transversal equalizer are employed for iterative establishment of said attenuator settings prior to message data transmission.

6. The combination in accordance with claim 2 in which said partial-response signals encode random data and said establishing means further comprises means deriving from said analog-to-digital converter signal polarity components indicative of the polarity of the received encoded data signal, and means correlating said signal polarity components with said stored error polarities and incrementing said attenuators if said enabling signal has been generated.

7. The combination in accordance with claim 2 in which said partial-response signals encode random data, each such signal corresponding to individual datum includes two equal nonzero response components of opposite polarity spaced apart by two signaling intervals and results, upon the transmission of successive datum so encoded, in a three-level received signal, and said establishing means further comprises means deriving from said analog-to-digital converter signal polarity components which may be positive, negative or indeterminate, means correlating said positive or negative components with said stored error polarities and incrementing said attenuators if said enabling signal has been generated, and enabling means operative to permit adjustment of said attenuators responsive to the absence of an indeterminate polarity signal from said deriving means.

8. In combination with an automatic transversal equalizer including a plurally tapped delay line, an adjustable attenuator in series with the input thereof and further adjustable attenuators in series with each tap thereon except a reference tap, an individual reversible counter controlling the adjustment of each attenuator, and a summation bus for the direct output of the reference tap and the attenuated outputs of each other tap, the improvement adapted such equalizer to respond to partial-response signals having response components dispersed over more than one signaling interval comprising a slice-and-fold digital circuit deriving polarity, signal and error components from signals appearing on said summation bus, multicelled means sequentially storing error components from said slice-and-fold circuit, means connecting the several cells of said storing means to said counters, means responsive to comparisons of selected error components according to the mutual relationship of nonzero components in the particular partial-response signal being equalized enabling the adjustment of said counters only when such error components are of the same relative polarity as such nonzero signal components.

9. The combination according to claim 8 in which the partial-response signal being equalized includes for each input signal two equal nonzero response components of the same relative polarity in adjacent signaling intervals, said storing means has one more cell than the number of taps on said delay line, and said enabling means is a plurality of exclusive-OR circuits whose inputs are connected to adjacent cells of said storing means and whose outputs are connected to respective counters.

10. Tne combination according to claim 8 in which the partial-response signal being equalized includes for each input signal two equal nonzero response components of opposite relative polarity at signaling intervals two apart from each other and a zero component midway in time between said nonzero components, said storing means has two more cells than the number of taps on said delay line, and said enabling means is a plurality of exclusive-OR circuits whose inputs are connected to cells of said storing means spaced two apart and whose outputs are connected to respective counters.

11. The combination according to claim 10 in which each of the exclusive-OR circuits constituting said enabling means have an inhibiting input, and said signal component from said slice-and-fold circuit is gated to the inhibiting inputs of said exclusive-OR circuits whenever said signal component is indeterminate in polarity.

12. The combination according to claim 8 including means delaying the polarity components from said slice-and-fold circuit by half the delay time of said line, and said connecting means includes an exclusive-OR circuit for each cell of said storing means correlating delayed polarity components from said delaying means with said stored error components.

References Cited

UNITED STATES PATENTS 3,414,819 12/1968 Lucky -------------- 325—42

ROBERT L. GRIFFIN, Primary Examiner

J. A. BRODSKY, Assistant Examiner

U.S. Cl. X.R.

333—18, 28; 325—323